(12) United States Patent
S (10) Patent No.: US 11,269,593 B2
(45) Date of Patent: Mar. 8, 2022

(54) GLOBAL NUMBER RANGE GENERATION (71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 16/255,360

(22) Filed: Jan. 23, 2019

(65) Prior Publication Data
US 2020/0233641 A1 Jul. 23, 2020

(51) Int. Cl.
G06F 3/00 (2006.01)
G06F 7/46 (2006.01)
G06F 9/54 (2006.01)

(52) U.S. Cl.
CPC . *G06F 7/46* (2013.01); *G06F 9/54* (2013.01)

(58) Field of Classification Search
CPC ........................................................ G06F 9/54
USPC ........................................................ 719/310
See application file for complete search history.

(56) References Cited

U.S. PATENT DOCUMENTS

| | | | | |
|---|---|---|---|---|
| 8,087,029 B1* | 12/2011 | Lindholm | ............. | G06F 9/3851 718/105 |
| 2010/0169486 A1* | 7/2010 | McCormack | ........... | H04L 49/90 709/226 |
| 2016/0142919 A1* | 5/2016 | Baldemair | ............. | H04W 16/10 455/447 |
| 2017/0083367 A1* | 3/2017 | Chen | ..................... | G06F 9/5016 |
| 2017/0127287 A1* | 5/2017 | Fujishiro | ............... | H04W 48/16 |
| 2018/0302340 A1* | 10/2018 | Alvarez Callau | ....... | H04L 47/76 |
| 2019/0068523 A1* | 2/2019 | Chagam Reddy | .. | G06F 11/3466 |

OTHER PUBLICATIONS

Young Choon Lee, Resource-efficient workflow scheduling in clouds. (Year: 2014).*
Piotr Jankowski, Integrating geographical information systems and multiple criteria decision-making methods. (Year: 1995).*
Marc Shapiro, A comprehensive study of Convergent and Commutative Replicated Data Types. (Year: 2011).*

* cited by examiner

Primary Examiner — Lechi Truong
(74) Attorney, Agent, or Firm — Mintz Levin Cohn Ferris Glovsky and Popeo, P.C.

(57) ABSTRACT

A system, a method, and a computer program product for generation and consumption of global numbers. A range of global numbers for consumption by a plurality of processes of a software application in a plurality of software applications is generated. The range of global numbers is generated in accordance with one or more requirements of the software application and includes a plurality of blocks of global numbers. The generated range of global numbers is provided to the software application for consumption by the plurality of processes. Each process is assigned a block of global numbers in the plurality of blocks of global numbers and consumes the assigned block of global numbers. A count of global numbers in the global number range consumed by each process in the plurality of processes is determined. Another range of global numbers is generated upon determination of the count being below a predefined threshold.

20 Claims, 4 Drawing Sheets

GLOBAL NUMBER RANGE GENERATION

TECHNICAL FIELD

This disclosure relates generally to data processing and, in particular, to an efficient generation of global number ranges for various applications, solutions, etc.

BACKGROUND

Many companies rely on software systems, components, applications, etc. as well as corresponding hardware components in conducting their daily activities. Software systems include email, word processing applications, internet browsing applications, financial software applications, sales applications, and/or many other types of software systems. Software is typically used by individuals to perform a variety of tasks and can involve vast amounts of data being generated, exchanged, manipulated, stored, etc.

Software systems, applications and solutions include a multitude components, processes, and/or objects that may interact with one another as well as with components, processes and/or objects of other software applications to perform a particular function. Coordination and cooperation among such components, processes, and/or objects is vital to smooth operation of software systems, generation of accurate results, as well as uninterrupted operation of businesses relying on such software systems. Each software component, object, process, etc. may be assigned a particular identification data to ensure that it is properly identified and accurately used. Proper and efficient generation and assignment of such identification data is important to continued operation of various processes, applications, etc.

SUMMARY

In some implementations, the current subject matter relates to a computer-implemented method for generation and consumption of global numbers. The method may include generating a range of global numbers for consumption by a plurality of processes of a software application in a plurality of software applications, the range of global numbers being generated in accordance with one or more requirements of the software application and includes a plurality of blocks of global numbers, providing the generated range of global numbers to the software application for consumption by the plurality of processes, wherein each process is assigned a block of global numbers in the plurality of blocks of global numbers and consumes the assigned block of global numbers, determining a count of global numbers in the global number range consumed by each process in the plurality of processes, and generating another range of global numbers upon determination of the count being below a predefined threshold.

In some implementations, the current subject matter may include one or more of the following optional features. The range of global numbers may include a plurality of global numbers. The range of global numbers may include a predetermined size defined in accordance with the one or more requirements of the software application. Each global number in the range of global numbers may include at least one of the following: a numeric value, an alpha value, an alpha-numeric value, and any combination thereof. Each global number in the range of global numbers may also include at least one of the following: a starting value, an ending value, a prefix character, a suffix character, an incremental value, a number of trailing zeros, a skipped character, a repetitive character, and any combination thereof.

In some implementations, the process may also include generating a queue of global numbers corresponding to each block of global numbers. Each process in the plurality of processes may be assigned the block of global numbers in the plurality of blocks of global numbers from the generated queue of global numbers. Global numbers within each block of global numbers may be consecutive global numbers.

In some implementations, the plurality of processes may include at least one of the following: a remote process, a local process and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter relates to a computing for generation and assignment of global number ranges across various software applications, computing solution(s), computing system(s), computing network(s), and/or any combination combinations thereof.

Global number ranges may be used and/or consumed by various in-cloud and/or on-premise software solutions, applications, etc. across various networks, including, but not limited to, local and/or remote networks (e.g., external to a particular computing system consuming a global number range). In some exemplary implementations, global number ranges may be used to identify and/or call a specific application, solution, etc. The current subject matter may provide an architecture for an efficient generic global number range service, where the global number ranges may be reused, to define and consume global number ranges. The definition of global number ranges may include generation, assignment (to specific application, solution, etc.), etc. of global number ranges and may be performed in a cloud, on-premise, etc. The global number ranges may be generated for a particular application, computing solution (e.g., enterprise solution), multiple applications/solutions, specific application(s)/solution(s), etc. Alternatively, the global number ranges may be generated regardless of specific application, solution, etc.

In some exemplary implementations, the global number generation may be provided as a scalable software as a service. Further, rules may be defined for the purposes of generating, assignment of numbers. The global number ranges may be generated in a way so as to appear to the application consuming them as if they are generated in the application's local computing environment (i.e., the global number ranges may be generated in accordance with various rules and requirements of the application's computing environment (e.g., specific length of the global number, specific length of the global number range, specific first digit in the global number, etc.)). The current subject matter's architecture may be configured to share the global numbers/ranges across applications that may be located in different geographical, computing, etc. regions substantially without any delay (e.g., latency).

In some implementations, the global numbers and/or global number ranges may be generated according to one or more of the following processes. The generation of numbers may include definition of number ranges, rules, and blocks.

The current subject matter architecture may initially define a global number range name and size of a global number. Then, one or more rules for generation of global numbers may be defined. The rules may be numeric and/or alpha-numeric. The numeric rules may include definition of at least one of the following: a start value, an end value, an increment value, number of trailing zeros (if any), and/or any other rules, and/or any combination thereof. The alpha-numeric rules may include definition of at least one of the following: inclusion of numeric and/or pure alphabet characters, skipping of characters, whether repetition of characters is allowed, inclusion of prefix characters, inclusion of suffix characters, and/or any other rules, and/or any combination thereof. Additionally, rules may also include a provision of an exit to (or access of) a rules management system to obtain the next global number in the event the generated range has been exhausted.

Then, the architecture may define one or more blocks of global numbers. For example, a single number range may be split into multiple blocks. In some exemplary implementations, an internal number range may be defined on block level. For example, 00000-99999 may be the total number range corresponding to a particular "business partner" (e.g., a particular user, a computing system, etc.), and within that range 00000-20000 may be assigned to a first software application associated with that business partner, 20001-30000 may be assigned to a second software application, etc. Alternatively, the defined global number range may be divided for usage by software applications based on various geographic regions (e.g., Germany, United States, etc.). In some implementations, the range of numbers may be continuous within a particular block of numbers.

The numbers may be assigned to various queues. An inbound queue for a particular application(s), solution(s), etc. may receive consumed global numbers that may have been already consumed by such application(s), solution(s), etc. An outbound queue may include numbers that may be ready to be provided to the application(s), solution(s), etc. upon receipt of a request for such numbers from the application(s), solution(s), etc. The numbers in the outbound queue may be provided by the number generation service of the architecture.

In some implementations, each block of numbers may correspond to a persistent queue from the global number range so that the numbers may be pushed into a queue of numbers (from which the numbers are provided to applications, solutions, etc.). Each number range may assign a new queue to each block. Each block may be associated with a cache size for which the numbers may be pushed into the queue. Queues may be used to avoid any lock and fast processing. Further, queues may also be used as smaller local cache. The generated numbers may be kept (e.g., stored) readily available in the queue for consumption by an application. This may cause faster processing of queues.

In some implementations, the current subject matter's architecture may determine whether number blocks may have an internal number range. If not, then no block may include an internal number range and each block may be assigned numbers in a round-robin fashion for the defined cache size of that block. Otherwise, specific internal number ranges may be defined for a particular block of numbers.

Further, the number of global numbers (and/or specific global numbers) consumed may be communicated back to the number generation service by the consuming applications, solutions, etc. This may be accomplished through the inbound queue, through rest end point, and/or in any other fashion. The information that may be communicated through the inbound queue may include one or more parameters identifying a block name, aggregated consumed count of numbers (e.g., 1 . . . n, etc.), and/or any other information.

In some implementations, the current subject matter may allow collection of global number ranges locally in accordance with a geographic region (e.g., Germany, United States). For example, certain numbers are generated and provided to application(s), solution(s), etc. (or to number queues associated with) based on the application(s), solution(s), etc. location of operation. This way latency of accessing ranges from different geographic regions may be reduced and/or avoided and consistency of consumption/use of global number ranges across all applications, solutions may be ensured.

In some implementations, the current subject matter architecture may provide one or more of the following advantages. A unique single global number range may be shared across multiple application(s), solution(s) of the same (or different) type. Multiple type of number ranges may be defined for different business objects (e.g., "business partners" (BP), sales orders (SO), etc.). Latency in fetching the global numbers across different regions may be reduced. Locking and/or concurrency issues may be reduced. Further, the current subject matter's reusable software as a service architecture may be available in a cloud and may be consumed without additional efforts.

Figure 1:
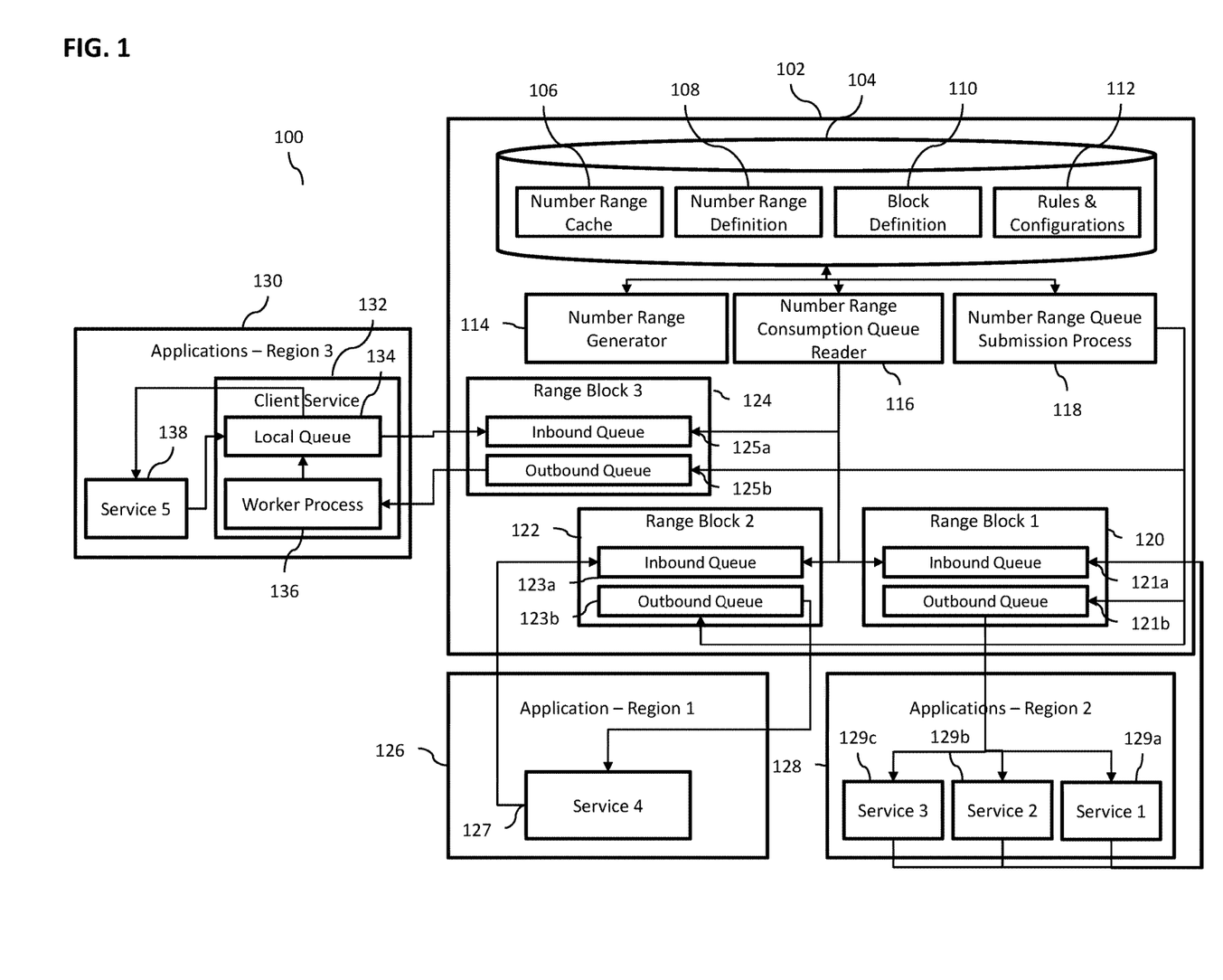
FIG. 1 illustrates an exemplary architecture for generation of global number ranges, according to some implementations of the current subject matter.

FIG. 1 illustrates an exemplary architecture 100 for generation of global number ranges, according to some implementations of the current subject matter. The architecture 100 may be implemented as software as a service. It may implemented using software, hardware, and/or any combination thereof. Further, architecture 100 may include one or more servers, databases, computing processors, memory locations, etc. The various components of the architecture 100 may be communicatively coupled using one or more networks and/or wireless/wired communication links.

As shown in FIG. 1, the architecture 100 may include a global number range service component 102 and consuming application(s)/solution(s) 126, 128, 130 (hereinafter referred to as "consuming application"). Consuming applications 126 and 128 may be "local" to the global number range service 102. For example, the consuming applications 126, 128 may be located (e.g., operating, consuming global numbers, etc.) within the same geographic region as the global number range service component 102. The consuming application 130 may be "remote" to the global number range service component 102. As can be understood, designations "local"/"remote" are not limited to geographical location and may refer to local/external networks, computing environments, etc.

The global number range service component 102 may include a data storage component 104, a number range generator 114, a number range consumption queue reader 116, a number range queue submission process component 118, and range block components 1, 2, 3 120, 122, 124. The data storage component 104 may include a number range cache component 106, a number range definition component 108, a block definition component 110, and a rules and configurations component 112. The data storage component 104 may be implemented using one or more databases, servers, processors, memory locations, etc.

The number range cache component 106 may include a cache of global number ranges that may have been previously generated by the component 114 for consumption by application(s), solution(s), etc. The number range definition component 108 may define a global number range name and size of a global number. The component 114 may generate such numbers in accordance with rules and/or configurations that may have been previously defined and stored by the rules and configurations component 112. As stated above, the rules may define whether the global numbers should include numeric and/or alpha-numeric parts. The numeric part rules may define a start value, an end value, an increment value, number of trailing zeros (if any), and/or any other parameters. The alpha-numeric part rules may indicate whether: numeric and/or pure alphabet characters may be included, characters may be skipped, character repetition may be allowed, prefix characters may be included, suffix characters may be included, etc. Further, rules may indicate whether a rules management system should be accessed to obtain the next global number in the event the generated range has been exhausted and no further consumable number ranges remain in the number range cache component 106.

The block definition component 110 may define one or more blocks of global numbers. The component 110 may determine whether ranges should be split into one or more blocks, whether internal number ranges should be defined for one or more block levels as well as how the number may be assigned to specific applications, solutions, etc. As discussed above, some exemplary implementations, an internal number range may be defined on block level. For example, 00000-99999 may be the total number range corresponding to one or more "business partners" (e.g., applications business partners 126, 128), and within that range 00000-20000 may be assigned to a range block 1 120, 20001-30000 may be assigned to range block 2 122, etc. The services (e.g., services 1, 2, 3) within a range block (e.g., range block 1) may share the numbers assigned to that range block. Alternatively, the defined global number range may be divided for usage by software applications based on various geographic regions (e.g., Germany, United States, etc.), e.g., a range of global numbers may be assigned to applications 130 in region 3. In some implementations, the range of numbers may be continuous within a particular block of numbers.

In some implementations, the numbers may be assigned to applications, solutions, etc. in any desired fashion and/or in accordance with specific requirements of such applications, solutions, etc. The rules and/or configurations associated with applications, solutions, etc. for generation and/or assignment of global numbers may be supplied to and stored by the rules and configurations component 112.

The number range generator component 114 may access the information stored in the storage component 102 and, in particular, the information stored by the number range cache component 106, the number range definition component 108, the block definition component 110, and the rules and configurations component 112, for the purposes of generating global number ranges. The number range generator 114 may be configured to generate global numbers upon request received from the storage component 102 (e.g., indicating that the number of available global numbers stored in the cache component 106 has fallen below a predefined threshold of available global number ranges). Alternatively, the number range generator 114 may be configured to generate global numbers for consumption by a specific application, solution, etc. (e.g., a request may be received to generate such numbers). The number range generator 114 may be configured to generate unique global numbers and ensure that generated global numbers are not already in use by other applications, solutions, etc. and/or have been already generated (but not yet consumed). The global numbers may be generated one by one, in blocks of numbers, in entire ranges, etc. Once the global numbers are generated, they may be provided to the storage component 102 for storage in the cache component 106 and may become available for consumption by applications, solutions, etc.

The number range consumption queue reader component 116 may communicate with inbound queue components 121*a* (of range block 1 120), 123*a* (or range block 122), and 125*a* (of range block 124) to determine which global numbers have been consumed/used by applications, solutions, etc. For example, the inbound queue 121*a* may include information indicative of which generated global numbers have been already consumed by services 1-3 129*a-c* of the application block 128. The services 1-3 129*a-c* may "pull" or consume such global numbers from an outbound queue 121*b* of range block 1 120, where the global numbers may be generated by the number range generator 114 and supplied to the outbound queue 121*b* from storage component 102 via the number range queue submission process component 118. In some exemplary implementations, the outbound queue 121*b* may include a predefined threshold of a number of global numbers that may be available by consumption by services 1-3 129*a-c*. If the number of available global numbers falls below threshold, an appropriate notification may be transmitted to the storage component 102 to provide additional global numbers for consumption.

In some exemplary implementations, as shown in FIG. 1, because services 1-3 129*a-c* belong to the same application, solution, etc., they may be configured to consume global numbers from the outbound queue 121*b* in a consecutive fashion. Alternatively, a predetermined range of global numbers may be assigned to each service 1-3 129a-c for consumption (e.g., when they are moved to different blocks within the same number range). Upon consumption of the global numbers from the outbound queue 121b, the services 1-3 129a-c may be configured to generate a count of global numbers (and/or an indication of which specific global numbers) that may have been consumed by them and transmit the count to the inbound queue 121a, which, in turn, may transmit this information to the number range consumption queue reader component 116. The component 116 may gather information from all inbound queues (i.e., queues 121a, 123a, 125a) then pass it along to the storage component 102. At this point, a determination may be made whether additional global numbers may need to be generated, and if so, the number generator 114 may be triggered to generate such further global numbers.

In some implementations, service 4 127 may be located in a different application, solution, etc. 126 and may require a separate range of global numbers as the global numbers that may have been generated for the services 1-3 129a-c might not be consumable by the service 4 127. Thus, separate range block 2 122 including a separate inbound queue 123a and a separate outbound queue 123b may be used for providing global numbers to the service 4 127 (from the outbound queue 123b) and receiving an indication as to the count of global numbers (and/or which global numbers) may have been consumed by the service 4 127. For example, number ranges for "sales order" and "business partner" objects may be assigned different prefixes (e.g., SO for "sales order" and BP for "business partner). The number ranges alone may be same, different, and/or overlapping. The "sales order" object(s) may have the following numbers assigned to it that start with a prefix SO: S000000-S099999, and "business partner" object(s) may be assigned "BP00000-BP99999". Even though the number ranges (without prefixes) are the same, they do will not be confused as each number would be begin with an appropriate prefix, which corresponds to an object that it is assigned to. In alternate exemplary implementations, a particular number range may have sub-ranges that may be differentiated by, for example a prefix (and/or any other character). For instance, number range 00000-99999 may have a sub-range S010000-S020000 assigned to "sales order" object(s) and a sub-range BP20001-BP30000 assigned to a "business partner" object. As can be understood, any other way of assigning numbers, pre-fixes, suffixes, etc. to differentiate among objects, solutions, applications, systems, etc. are possible. These may be defined using various rules and configurations that may be stored in rules and configurations component 112 and/or defined in any other way.

In some implementations, service 5 138 may be part of an application, solution, etc. 130, which may be remotely located from the number ranger service 102. To reduce latency in providing and/or consumption of global numbers, the number range generator component 114 may be configured to designate and generate a range of global numbers specifically for consumption by service 5 138. Such generated global numbers may be supplied to the outbound queue 125b of the range block 3 124 by the number range queue submission process component 118. The outbound queue 125b may then transmit the generated global numbers to a worker process (e.g., a processor, a database, a server, etc.) component 136 of a client service component 132 that is local to the application, solution, etc. 130. The component 136 may then pass the generated global numbers to a local queue component 134. Once the global numbers become available, the service 5 138 may begin consumption of the global numbers from the local queue 134 and reporting consumption count (and/or which global numbers have been consumed). In some implementations, because of the remote location of the application, solution, etc. 130, once the outbound queue 125b transmits the global numbers for consumption by the service 5 138, the inbound queue 125a may report to the number range consumption queue reader component 116 that the global numbers have been consumed. Alternatively, the inbound queue 125a may request from local queue 134 a status update that may indicate a count of global numbers (and/or which global numbers) may have been consumed.

In some implementations, the local queue 134 may determine that the count of global numbers available for consumption has fallen below a predetermined threshold and transmit a request to the inbound queue 125a to request more global numbers. Because of the remote location of the application, solution, etc. 130, the determined threshold of the local queue 134 may be higher than thresholds associated with queues of local applications, services, etc. 126, 128. This may ensure that service 5 138 continues to operate and consume global numbers in the local queue 134 while the client service 132 awaits receipt of a new range of global numbers.

In some implementations, one or more global number ranges, blocks of global numbers may be generated and supplied to appropriate applications, solutions, etc. for consumptions by their services. The global numbers may be generated, assigned, supplied, etc. automatically to applications, solution, etc. and/or upon request. The request can be generated as a result of queues falling below a predetermined threshold of a count of global numbers available for consumption. Alternatively, once a particular global number has been consumed by a service of an application, solution, etc., a message may be transmitted to the inbound queue (and then to the storage component 102, number range generator 114, etc.) indicating that a global number and/or a global number range has been consumed and replenishment of global numbers is requested for that service. The global number/global number range may be supplied to the appropriate outbound queue from the number range cache component 106 and/or directly generated by the number range generator component 114 (using the information contained in the components 106-112).

The global numbers may have any desired length, any desired number and/or arrangement of any alpha-numeric and/or numeric characters and may be arranged in any desired ranges and/or blocks. Each character and/or its position in a global number may be predetermined in accordance with specific rules and configurations stored by the component 112. The global number may designate a software process, a dynamic object, a static object, a data storage element, etc. (e.g., a sales order, a business object, etc.).

Figure 2:
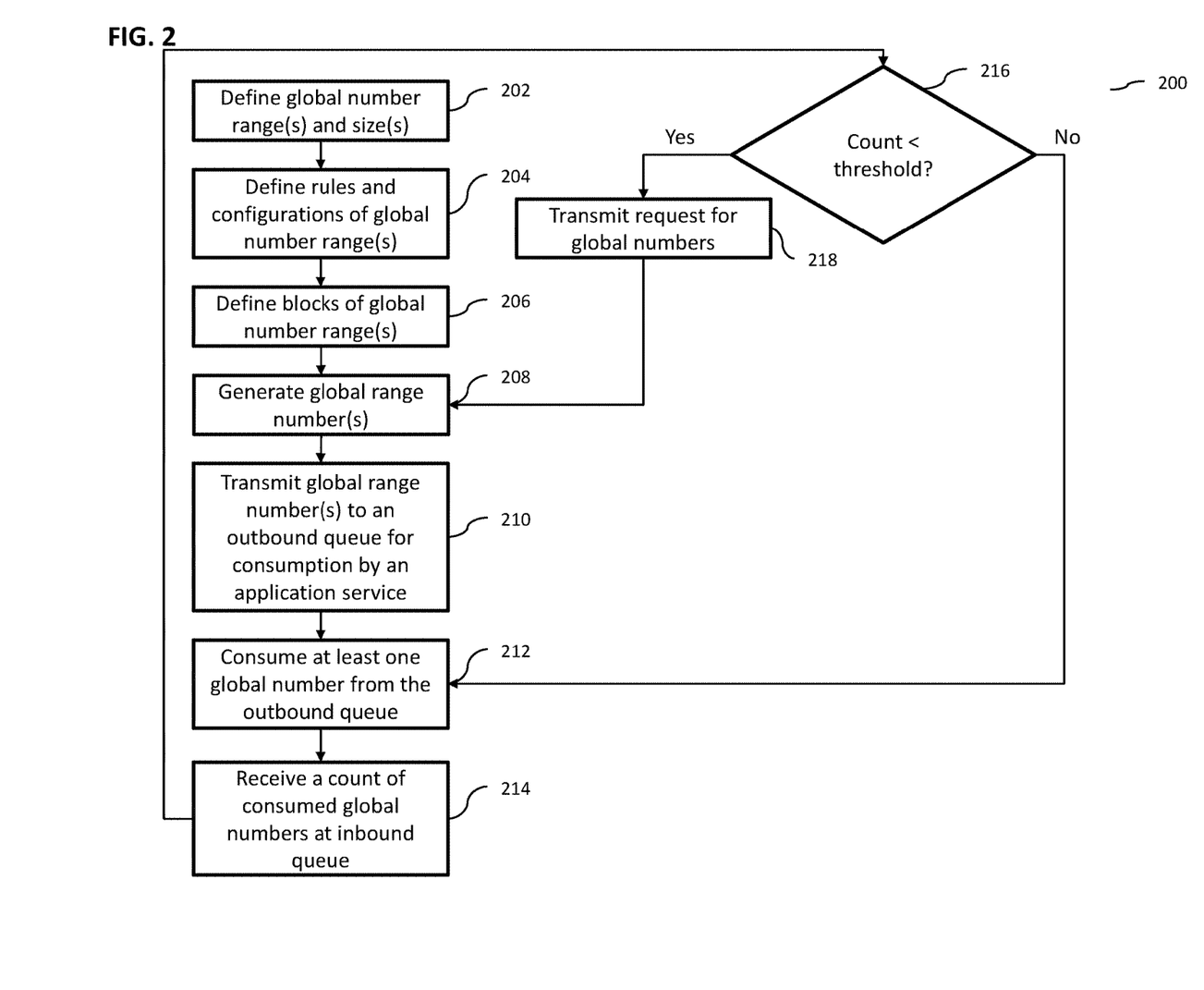
FIG. 2 illustrates an exemplary process for generating and consuming a global number by a service of an application, solution, etc., according to some implementations of the current subject matter.

FIG. 2 illustrates an exemplary process 200 for generating and consuming a global number by a service of an application, solution, etc., according to some implementations of the current subject matter. At 202, a global number range(s) and/or size(s) may be defined. These can be defined by the component 102 (shown in FIG. 1) using number range definition component 108 and/or rules and/or configurations component 112. At 204, the rules and configurations of the global number ranges may be defined (e.g., using rules and configuration component 112, as shown in FIG. 1). At 206, blocks of global numbers may also be defined. Block definition component 110 of the storage component 102 (as shown in FIG. 1) may be configured to define such blocks, as discussed above.

Once the global numbers/ranges/blocks are defined, they may be transmitted to an outbound queue corresponding to particular applications, solutions, etc., at 210. The number range queue submission process component 118 may be configured to transmit specific global numbers/ranges/blocks to particular range blocks (e.g., range blocks 120, 122, 124, as shown in FIG. 1), which may correspond to specific applications, solutions, etc. The global numbers/ranges/blocks may be transmitted automatically, upon request, upon determination that a count of available global numbers/ranges/blocks has fallen below a predefined threshold.

At 212, the global numbers/ranges/blocks may be consumed by services of applications, solutions, etc. (e.g., services 129a-c, 127, 138, as shown in FIG. 1). Consumption may include use of the global numbers for various functionalities, objects, processes, etc. that may be associated with the consuming services 127, 129a-c, 138.

Once the global numbers/ranges/blocks are consumed, the consuming services may provide a count (as well as an indication of which global numbers may have been consumed by them) of the consumed numbers to an inbound queue of a range block (e.g., inbound queues 121a, 123a, 125a as shown in FIG. 1), at 124. The count may indicate how many global numbers/ranges/blocks may have been consumed. At 216, the process 200 may determine whether the count of available global numbers/ranges/blocks may have fallen below a predetermined threshold and if so, it may transmit a request for additional global numbers/ranges/blocks, at 218. Otherwise, consumption of global numbers/ranges/blocks by the services of applications/solutions, etc. may continue, at 212.

Figure 3:
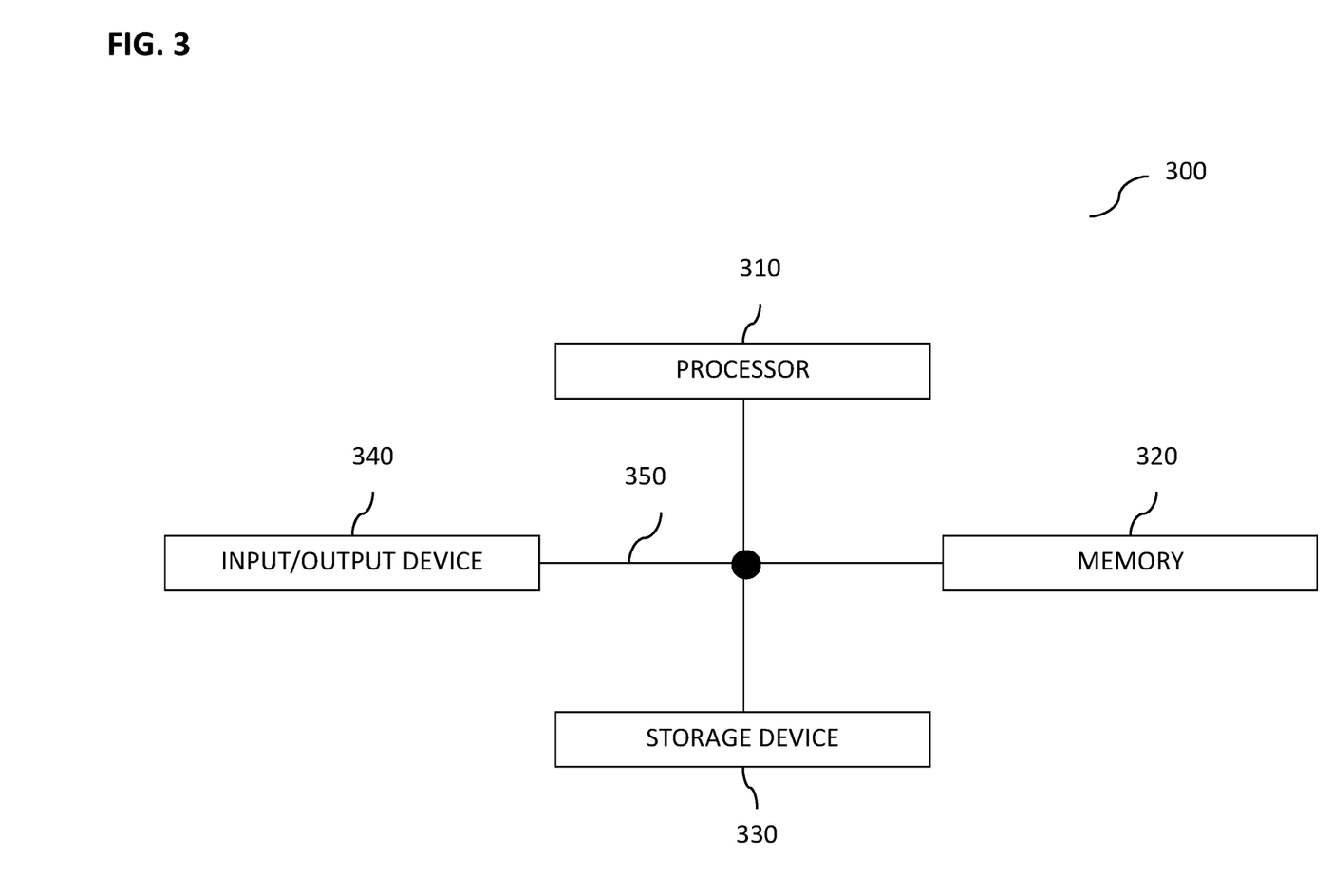
FIG. 3 is an exemplary system, according to some implementations of the current subject matter.

In some implementations, the current subject matter may be configured to be implemented in a system 300, as shown in FIG. 3. The system 300 may include a processor 310, a memory 320, a storage device 330, and an input/output device 340. Each of the components 310, 320, 330 and 340 may be interconnected using a system bus 350. The processor 310 may be configured to process instructions for execution within the system 300. In some implementations, the processor 310 may be a single-threaded processor. In alternate implementations, the processor 310 may be a multi-threaded processor. The processor 310 may be further configured to process instructions stored in the memory 320 or on the storage device 330, including receiving or sending information through the input/output device 340. The memory 320 may store information within the system 300. In some implementations, the memory 320 may be a computer-readable medium. In alternate implementations, the memory 320 may be a volatile memory unit. In yet some implementations, the memory 320 may be a non-volatile memory unit. The storage device 330 may be capable of providing mass storage for the system 300. In some implementations, the storage device 330 may be a computer-readable medium. In alternate implementations, the storage device 330 may be a floppy disk device, a hard disk device, an optical disk device, a tape device, non-volatile solid state memory, or any other type of storage device. The input/output device 340 may be configured to provide input/output operations for the system 300. In some implementations, the input/output device 340 may include a keyboard and/or pointing device. In alternate implementations, the input/output device 340 may include a display unit for displaying graphical user interfaces.

Figure 4:
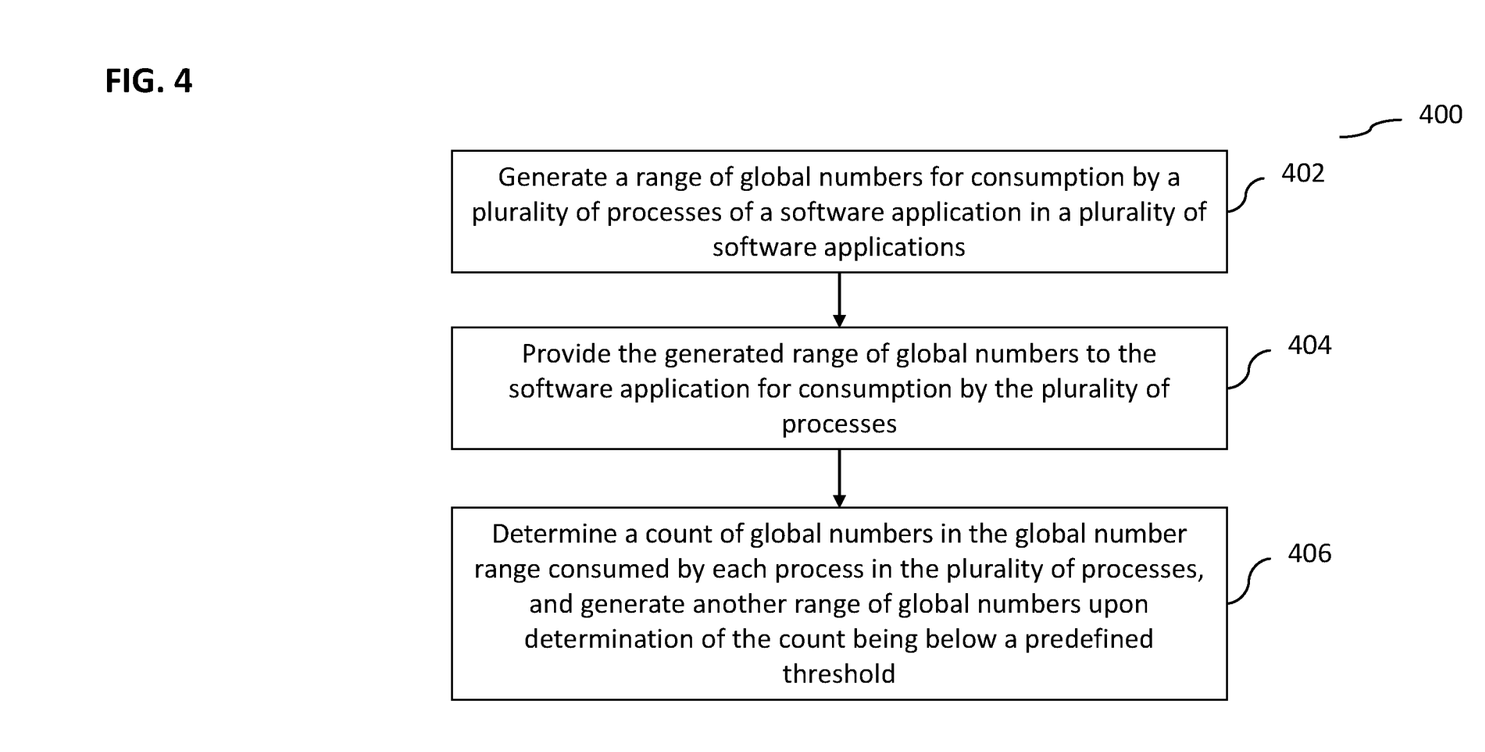
FIG. 4 is an exemplary method, according to some implementations of the current subject matter.

FIG. 4 illustrates an exemplary method 400 for generation and consumption of global numbers, according to some implementations of the current subject matter. At 402, a range of global numbers for consumption by a plurality of processes of a software application in a plurality of software applications may be generated. The range of global numbers may be generated in accordance with one or more requirements of the software application and may include a plurality of blocks of global numbers. At 404, the generated range of global numbers may be provided to the software application for consumption by the plurality of processes. Each process may be assigned a block of global numbers in the plurality of blocks of global numbers and consumes the assigned block of global numbers. At 406, a count of global numbers in the global number range consumed by each process in the plurality of processes may be determined. Another range of global numbers may be generated upon determination of the count falls below a predefined threshold.

In some implementations, the current subject matter may include one or more of the following optional features. The range of global numbers may include a plurality of global numbers. The range of global numbers may include a predetermined size defined in accordance with the one or more requirements of the software application. Each global number in the range of global numbers may include at least one of the following: a numeric value, an alpha value, an alpha-numeric value, and any combination thereof. Each global number in the range of global numbers may also include at least one of the following: a starting value, an ending value, a prefix character, a suffix character, an incremental value, a number of trailing zeros, a skipped character, a repetitive character, and any combination thereof.

In some implementations, the process may also include generating a queue of global numbers corresponding to each block of global numbers. Each process in the plurality of processes may be assigned the block of global numbers in the plurality of blocks of global numbers from the generated queue of global numbers. Global numbers within each block of global numbers may be consecutive global numbers.

In some implementations, the plurality of processes may include at least one of the following: a remote process, a local process and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
generating a range of global numbers for consumption by a plurality of processes of a software application in a plurality of software applications, the range of global numbers being generated in accordance with one or more requirements of the software application and includes a plurality of blocks of global numbers, each global number in the range of global numbers having a predetermined length, each character and a position of each character in each global number being determined using one or more requirements of each process in the plurality of processes of the software application, the plurality of software applications including at least one first software application being geographically local to the generated range of global numbers and at least one second software application being geographically remote to the generated range of global numbers;
providing the generated range of global numbers to the at least one of the first and second software applications for consumption by the plurality of processes of the at least one first and second software applications, wherein each process is assigned a block of global numbers in the plurality of blocks of global numbers in accordance with a type of and a geographical location of each process and consumes the assigned block of global numbers;
determining a count of global numbers in the global number range consumed by each process in the plurality of processes in accordance with the geographical location of each process, and generating another range of global numbers upon determination of the count being below a predefined threshold for the geographical location of each process.

2. The method according to claim 1, wherein the range of global numbers includes a plurality of global numbers, wherein the range of global numbers includes a predetermined size defined in accordance with the one or more requirements of the software application.

3. The method according to claim 2, wherein each global number in the range of global numbers includes at least one of the following: a numeric value, an alpha value, an alpha-numeric value, and any combination thereof.

4. The method according to claim 2, wherein each global number in the range of global numbers includes at least one of the following: a starting value, an ending value, a prefix character, a suffix character, an incremental value, a number of trailing zeros, a skipped character, a repetitive character, and any combination thereof.

5. The method according to claim 1, further comprising generating a queue of global numbers corresponding to each block of global numbers, wherein each process in the plurality of processes is assigned the block of global numbers in the plurality of blocks of global numbers from the generated queue of global numbers.

6. The method according to claim 5, wherein global numbers within each block of global numbers are consecutive global numbers.

7. The method according to claim 1, wherein the plurality of processes includes at least one of the following: a remote process, a local process and any combination thereof.

8. A system comprising:
at least one programmable processor; and
a non-transitory machine-readable medium storing instructions that, when executed by the at least one programmable processor, cause the at least one programmable processor to perform operations comprising:
generating a range of global numbers for consumption by a plurality of processes of a software application in a plurality of software applications, the range of global numbers being generated in accordance with one or more requirements of the software application and includes a plurality of blocks of global numbers, each global number in the range of global numbers having a predetermined length, each character and a position of each character in each global number being determined using one or more requirements of each process in the plurality of processes of the software application, the plurality of software applications including at least one first software application being geographically local to the generated range of global numbers and at least one second software application being geographically remote to the generated range of global numbers;
providing the generated range of global numbers to the at least one of the first and second software applications for consumption by the plurality of processes of the at least one first and second software applications, wherein each process is assigned a block of global numbers in the plurality of blocks of global numbers in accordance with a type of and a geographical location of each process and consumes the assigned block of global numbers;
determining a count of global numbers in the global number range consumed by each process in the plurality of processes in accordance with the geographical location of each process, and generating another range of global numbers upon determination of the count being below a predefined threshold for the geographical location of each process.

9. The system according to claim 8, wherein the range of global numbers includes a plurality of global numbers, wherein the range of global numbers includes a predetermined size defined in accordance with the one or more requirements of the software application.

10. The system according to claim 9, wherein each global number in the range of global numbers includes at least one of the following: a numeric value, an alpha value, an alpha-numeric value, and any combination thereof.

11. The system according to claim 9, wherein each global number in the range of global numbers includes at least one of the following: a starting value, an ending value, a prefix character, a suffix character, an incremental value, a number of trailing zeros, a skipped character, a repetitive character, and any combination thereof.

12. The system according to claim 8, wherein the operations further comprise generating a queue of global numbers corresponding to each block of global numbers, wherein each process in the plurality of processes is assigned the block of global numbers in the plurality of blocks of global numbers from the generated queue of global numbers.

13. The system according to claim 12, wherein global numbers within each block of global numbers are consecutive global numbers.

14. The system according to claim 8, wherein the plurality of processes includes at least one of the following: a remote process, a local process and any combination thereof.

15. A computer program product comprising a non-transitory machine-readable medium storing instructions that, when executed by at least one programmable processor, cause the at least one programmable processor to perform operations comprising:
generating a range of global numbers for consumption by a plurality of processes of a software application in a plurality of software applications, the range of global numbers being generated in accordance with one or more requirements of the software application and includes a plurality of blocks of global numbers, each global number in the range of global numbers having a predetermined length, each character and a position of each character in each global number being determined using one or more requirements of each process in the plurality of processes of the software application, the plurality of software applications including at least one first software application being geographically local to the generated range of global numbers and at least one second software application being geographically remote to the generated range of global numbers;
providing the generated range of global numbers to the at least one of the first and second software applications for consumption by the plurality of processes of the at least one first and second software applications, wherein each process is assigned a block of global numbers in the plurality of blocks of global numbers in accordance with a type of and a geographical location of each process and consumes the assigned block of global numbers;
determining a count of global numbers in the global number range consumed by each process in the plurality of processes in accordance with the geographical location of each process, and generating another range of global numbers upon determination of the count being below a predefined threshold for the geographical location of each process.

16. The computer program product according to claim 15, wherein the range of global numbers includes a plurality of global numbers, wherein the range of global numbers includes a predetermined size defined in accordance with the one or more requirements of the software application.

17. The computer program product according to claim 16, wherein each global number in the range of global numbers includes at least one of the following: a numeric value, an alpha value, an alpha-numeric value, and any combination thereof.

18. The computer program product according to claim 16, wherein each global number in the range of global numbers includes at least one of the following: a starting value, an ending value, a prefix character, a suffix character, an incremental value, a number of trailing zeros, a skipped character, a repetitive character, and any combination thereof.

19. The computer program product according to claim 15, wherein the operations further comprise generating a queue of global numbers corresponding to each block of global numbers, wherein each process in the plurality of processes is assigned the block of global numbers in the plurality of blocks of global numbers from the generated queue of global numbers.

20. The computer program product according to claim 19, wherein global numbers within each block of global numbers are consecutive global numbers;
   wherein the plurality of processes includes at least one of the following: a remote process, a local process and any combination thereof.

\* \* \* \* \*